United States Patent
Emanetoglu et al.

(10) Patent No.: US 11,867,794 B2
(45) Date of Patent: Jan. 9, 2024

(54) DOPPLER RADAR BASED BEE HIVE ACTIVITY MONITORING SYSTEM

(71) Applicant: University of Maine System Board of Trustees, Orono, ME (US)

(72) Inventors: Nuri W. Emanetoglu, Orono, ME (US); Herbert Aumann, Orono, ME (US)

(73) Assignee: University of Maine System Board of Trustees, Orono, ME (US)

( * ) Notice: Subject to any disclaimer, the term of this patent is extended or adjusted under 35 U.S.C. 154(b) by 598 days.

(21) Appl. No.: 16/973,624

(22) PCT Filed: Jul. 5, 2019

(86) PCT No.: PCT/US2019/040673
§ 371 (c)(1),
(2) Date: Dec. 9, 2020

(87) PCT Pub. No.: WO2020/014081
PCT Pub. Date: Jan. 16, 2020

(65) Prior Publication Data
US 2021/0165089 A1    Jun. 3, 2021

Related U.S. Application Data

(60) Provisional application No. 62/696,040, filed on Jul. 10, 2018.

(51) Int. Cl.
*G01S 13/56* (2006.01)
*A01K 47/06* (2006.01)
(Continued)

(52) U.S. Cl.
CPC .............. *G01S 13/56* (2013.01); *A01K 47/06* (2013.01); *G01S 7/40* (2013.01); *G01S 13/582* (2013.01); *G01S 13/88* (2013.01)

(58) Field of Classification Search
CPC .......... G01S 13/56; G01S 7/40; G01S 13/582; G01S 13/88; G01S 13/583; G01S 15/88; (Continued)

(56) References Cited

U.S. PATENT DOCUMENTS 4,410,967 A * 10/1983 Hendricks ............... G01S 15/88
                                                                    367/87
6,445,301 B1    9/2002 Farrell et al.
(Continued)

FOREIGN PATENT DOCUMENTS

| FR | 2820536 A1 * | 8/2002 | ............. A01K 47/06 |
| WO | WO2016/064735 A1 * | 4/2016 | ............. G06F 17/40 |
| WO | 2017051359 A1 | 3/2017 | |

OTHER PUBLICATIONS

PCT International Search Report and Written Opinion, Application No. PCT/US2019/040673, dated Oct. 1, 2019.
(Continued)

*Primary Examiner* — Bernarr E Gregory
(74) *Attorney, Agent, or Firm* — MacMillan, Sobanski & Todd, LLC

(57) ABSTRACT

An apparatus for detecting and recording insect flying activities, such as outside a bee hive, with a Doppler radar is described. Also described is a system including a plurality of apparatuses for detecting and recording insect flying activities, such as outside a bee hive, with a Doppler radar.

26 Claims, 3 Drawing Sheets

(51) Int. Cl.
*G01S 7/40* (2006.01)
*G01S 13/58* (2006.01)
*G01S 13/88* (2006.01)
*G01S 13/00* (2006.01)

(58) Field of Classification Search
CPC ........ A01K 47/06; A01K 47/00; G06F 17/40; E04B 1/72; A01M 1/026; G01V 8/005
See application file for complete search history.

(56) References Cited

U.S. PATENT DOCUMENTS

| | | | |
|---|---|---|---|
| 6,653,971 B1* | 11/2003 | Guice | A01M 1/026 342/28 |
| 6,910,941 B2 | 6/2005 | Bromenshenk et al. | |
| 7,057,516 B2* | 6/2006 | Donskoy | A01M 1/026 340/567 |
| 8,152,590 B2 | 4/2012 | Brundage | |
| 9,295,245 B1 | 3/2016 | Guice et al. | |
| 9,807,346 B2 | 10/2017 | Afanasyev et al. | |
| 2005/0212691 A1* | 9/2005 | Tirkel | G01V 8/005 342/194 |
| 2007/0052578 A1 | 3/2007 | Ramakrishnan | |
| 2012/0268315 A1* | 10/2012 | Tirkel | G01S 13/88 342/147 |
| 2013/0047497 A1* | 2/2013 | White | E04B 1/72 43/132.1 |
| 2017/0079249 A1 | 3/2017 | Chapa | |
| 2018/0092336 A1 | 4/2018 | Erickson et al. | |

OTHER PUBLICATIONS

Aumann et al., "An Index for Assessing the Foraging Activities of Honeybees with a Doppler Sensor", IEEE Instrumentation and Measurement Society, 2017, pp. 1-5.

Aumann, "A Technique for Measuring the RCS of Free Flying Honeybees with a 24 GHz CW Doppler Radar", 12th European Conference, Department of Electrical and Computer Engineering, University of Maine, 2018, URL: https://ieeexplore.ieee.org/stampPDF/getPDF.jsp?tp=6arnumber=85682186ref=aHROcHM6Ly9pZWVle HBsb3JlLmllZWUub3JnL2RvY3VtZW50Lzg1NjgyMTg=> Retrieved from the Internet, Feb. 28, 2022.

The extended European search report, Application No. 19833931.9, dated Mar. 14, 2022.

* cited by examiner

DOPPLER RADAR BASED BEE HIVE ACTIVITY MONITORING SYSTEM

RELATED APPLICATIONS

This is the national stage application of international application PCT/US2019/040673, filed under the authority of the Patent Cooperation Treaty on Jul. 5, 2019, published; which claims priority to United States Provisional Application No. 62/696,040, filed under 35 U.S.C. § 111(b) on Jul. 10, 2018. The entire disclosure of each of the aforementioned applications is incorporated herein by reference for all purposes.

BACKGROUND

Honey bees pollinate more than 80% of US agricultural plants. However, there are issues in beekeeping that adversely affect the ability of beekeepers to keep bee colonies alive. For example, the sudden disappearance of honey bees, commonly referred to as colony collapse disorder (CDD), is a global problem that threatens agriculture. In CCD, worker bees suddenly disappear and do not come back to their hives, leaving behind the queen and immature bees. As another example, robber bees can steal nectar, or honey, from bees from other colonies, which happens more often during a nectar death. It would be advantageous to develop new and improved methods and apparatuses for monitoring beehive activity in order to observed in real-time, predict, or prevent such issues.

SUMMARY

Provided is an inexpensive and portable beehive activity monitor based on Doppler radar. The beehive monitor is based on measuring the root-mean-square (rms) of the Doppler signal generated when bees fly in front of the radar. Low-cost beehive activity monitors are useful for monitoring bee activity at a large number of hives, for instance as might be deployed for pollination at a blueberry barren in blueberry agriculture.

Provided is an apparatus for monitoring bee hive activity comprising a Doppler radar front end comprising a microwave detector configured to generate a Doppler signal when a flying insect flies in proximity to the apparatus, wherein the microwave detector operates at a frequency in a range of from about 10.5 GHz to about 24 GHz, an audio frequency amplifier in communication with the Doppler radar front end, and a data acquisition unit configured to measure the root-mean-square (rms) value of the Doppler signals overs a period of time, wherein the audio frequency amplifier is configured to amplify the Doppler signal to a level detectable by the data acquisition unit. In certain embodiments, the microwave detector operates at a frequency of either about 10.5 GHz or about 24 GHz. In certain embodiments, the microwave detector operates a frequency of 10.5 GHz. In certain embodiments, the microwave detector operates at a frequency of 24 GHz.

In certain embodiments, the apparatus does not include a microphone.

In certain embodiments, the flying insect is a honeybee. In certain embodiments, the flying insect is flying in proximity to a bee hive. In certain embodiments, the apparatus is mounted on a bee hive.

In certain embodiments, the apparatus further comprises a memory configured to store the rms value. In certain embodiments, the apparatus further comprises a processor configured to compare the rms value to one or more previously generated values.

In certain embodiments, the apparatus wirelessly communicates with a central base station. In particular embodiments, the wireless communication is through a radio communication link Further provided is a system for monitoring bee hive activity, the system comprising a plurality of bee hive activity monitors as described herein, wherein each of the plurality of bee hive activity monitors is disposed in an area proximate to a bee hive, and a central base station in wireless communication with the plurality of bee hive activity monitors, wherein central base station is configured to record or calculate an activity index from data received from the bee hive activity monitors.

In certain embodiments, the plurality of bee hive activity monitors communicate with the central base station via radio. In certain embodiments, the central base station is in wireless communication with a smart device. In certain embodiments, the system further comprises one or more smart devices in wireless communication with the central base station. In certain embodiments, the central base station comprises a radio communicatively coupled to a single board computer.

In certain embodiments, the central base station comprises a power management unit configured to supply power to the central base station. In particular embodiments, the power management unit comprises one or more of a solar panel, a battery, a battery charger, and a voltage converter.

In certain embodiments, the central base station communicates data over a WiFi network.

Further provided is a method for monitoring bee hive activity, the method comprising measuring total energy in a return signal due to Doppler signals from flying bees, and comparing the total energy to one or more past activity levels to monitor bee hive activity, wherein the measuring is conducted with a microwave detector operating at a frequency in a range of from about 10.5 GHz to about 24 GHz. In certain embodiments, the microwave detector operates at a frequency of either about 10.5 GHz or about 24 GHz. In certain embodiments, the microwave detector operates a frequency of 10.5 GHz. In certain embodiments, the microwave detector operates at a frequency of 24 GHz.

In certain embodiments, the one or more past activity levels are compared taking into account weather conditions. In certain embodiments, an activity index based on the measurement is calculated.

In certain embodiments, the method comprises comparing the total energy in the Doppler signal to measured weather conditions to detect anomalous behavior. In particular embodiments, anomalously increased activity behavior compared to the past activity levels predicts the timing of a bee colony swarm event. In particular embodiments, anomalously decreased activity behavior compared to the past activity levels predicts a sickly bee colony.

In certain embodiments, an algorithm converts analog radar signals into digital signals, and compresses the digital signals into activity indices. In particular embodiments, the activity indices are corrected for environmental conditions. In particular embodiments, the environmental conditions comprise temperature or solar radiation.

BRIEF DESCRIPTION OF THE DRAWINGS

The patent or application file may contain one or more drawings executed in color and/or one or more photographs.

Copies of this patent or patent application publication with color drawing(s) and/or photograph(s) will be provided by the U.S. Patent and Trademark Office upon request and payment of the necessary fees.

DETAILED DESCRIPTION

Throughout this disclosure, various publications, patents, and published patent specifications may be referenced by an identifying citation. The disclosures of these publications, patents, and published patent specifications are hereby incorporated by reference into the present disclosure in their entirety to more fully describe the state of the art to which this invention pertains.

Provided herein is a beehive activity monitor based on Doppler radar, and a system for monitoring beehive activity. The beehive activity monitor is an inexpensive and portable beehive activity monitor that can be used to gather information on bee activity levels over time, and detect changes in colony behavior. The system may be implemented to monitor behavior of a plurality of bee hives at once, and make predictions about colony health and activity based on the detected behavior of the plurality of bee hives.

Figure 1:
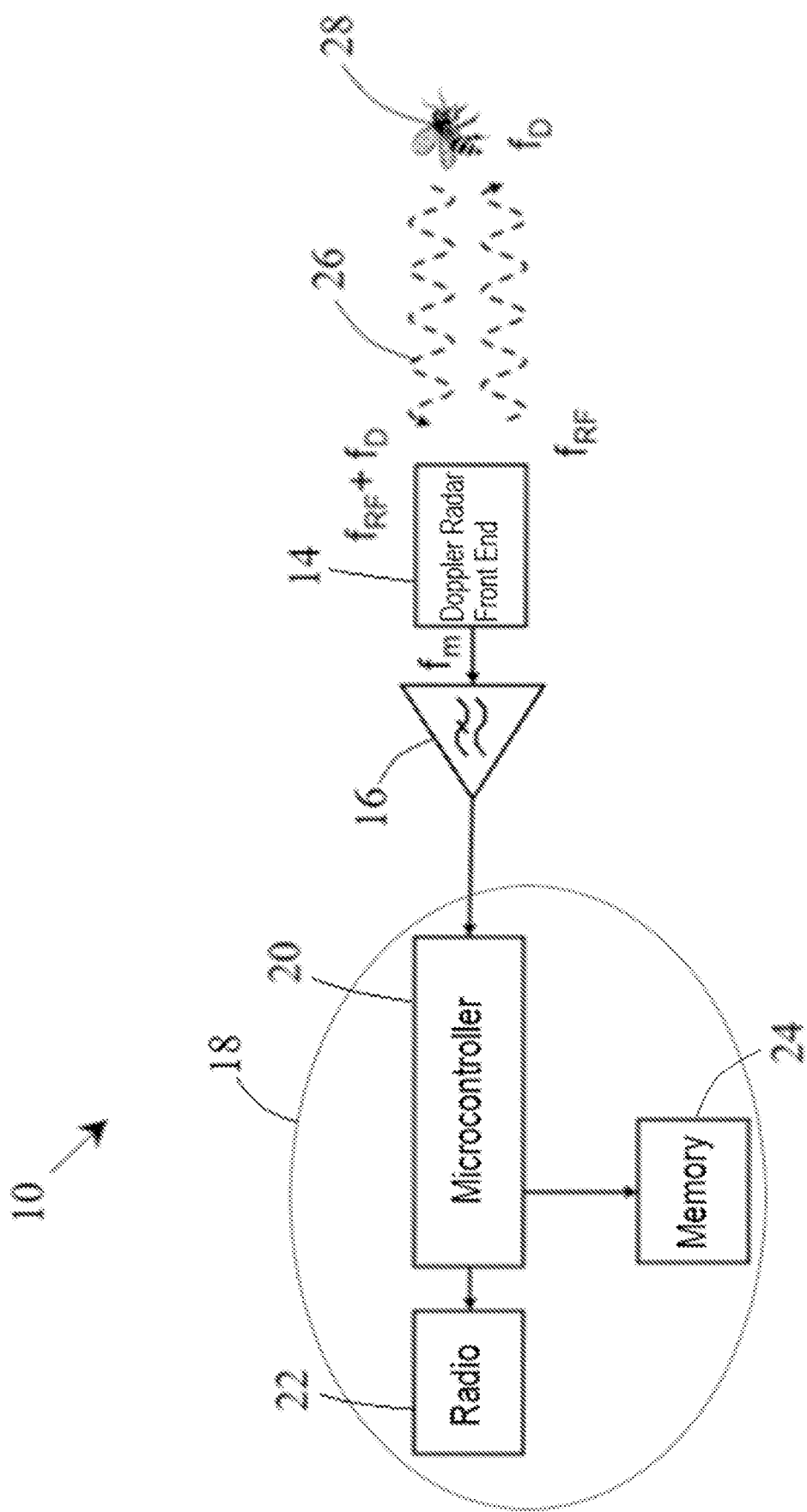
FIG. 1: Schematic illustration of a non-limiting example bee hive activity monitor in accordance with the present disclosure.

FIG. 1 depicts a functional block diagram of a bee hive activity monitor 10. Referring now to FIG. 1, the bee hive activity monitor 10 may be composed of a radio frequency Doppler radar front end 14, an audio frequency amplifier 16, and a data acquisition unit 18 that includes a microcontroller 20, a radio 22, and a memory 24 such as an SD card. A bee's flight is detected by a Doppler sensor in the Doppler radar front end 14, represented in FIG. 1 as a signal 26 with frequency $f_D$. The Doppler sensor may be, for example, a microwave detector operating at a frequency in the range of from about 5.8 GHz to about 24 GHz. In certain examples, the microwave detector operates at a frequency in the range of from about 10.5 GHz to about 24 GHz. In certain examples, the microwave detector operates at a frequency of either about 10.5 GHz or about 24GHz.

Referring still to FIG. 1, the signal conditioning amplifier 16 may filter out unwanted signals and amplify the Doppler signals at the range of frequencies of interest. The microcontroller 20 may measure the signal at the output of the amplifier 16 and calculate an activity index from the signal. The microcontroller 20 can store the activity index at the local memory 24 (such as an SD card) and can transmit the activity index to a base station or other apparatus via wireless communication, such as radio, Bluetooth, WiFi, or other digital radio technology. The data may be stored on-board in the memory 24 for later, off-line diagnostic analysis.

Doppler radar is a specialized radar that detects the Doppler frequency shift, which is proportional to the velocity of an object at a distance, by bouncing a microwave signal off a desired target and analyzing how the object's motion has altered the frequency of the returned signal. This variation gives a direct measurement of the radial component of the target's velocity relative to the radar. When pointed at a bee hive entrance, or placed next to a bee hive entrance and pointed away from it, the Doppler shift due to the flight of individual bees can be detected.

An algorithm in firmware in the bee hive activity monitor 10 may process radar recordings into a single number that is indicative of the level of flight activity in front of a beehive, which can be related to the productivity and health of a beehive. The number may be suitable for wireless transmission and long-term monitoring of multiple hives. The bee hive activity monitor 10 can be configured to measure the root-mean-square (rms) of the Doppler signal 26 generated when bees 28 fly in front of the radar sensor 14. The rms of a set of values is used as a measure of the typical magnitude of the set of numbers, regardless of their sign. This value can then be time-stamped by the microcontroller 20, stored in the memory 24, and/or communicated to an outside source through the radio 22. The stored values can be correlated with the time of day, weather conditions, and the like, and can be compared with previous activity to generate a human-readable indicator of the bee hive's activity levels. Based on the comparison, the bee hive activity monitor 10 may provide an early warning for CCD or other adverse events.

The bee hive activity monitor 10 can measure the total energy in the analog Doppler radar return signal that is due to incoming and outgoing bees. An algorithm, which may be implemented in firmware, may convert the analog radar signals into digital signals, and may extract the Doppler from incoming and outgoing bees. The microcontroller 20 may include firmware that calculates an activity index (activity measure, activity indicator) based on the measurements taken. Thus, an algorithm may convert analog radar signals into digital signals, and may compress the digital signals into activity indices. The algorithm may further compare the activity indices with previously reported activity indices to determine changes in the hive activity levels as a function of time. The algorithm may also compare the activity indices from the bee hive monitor 10 with other monitors on other bee hives in the same apiary, to make a judgement on the relative health of the hives. The algorithm may make a wireless, time-stamped transmission of the activity indices in near real-time to a central base station or other remote apparatus or device.

Referring still to FIG. 1, the Doppler radar front end 14 can be a custom built, or a commercially available unit. Non-limiting examples of the latter include the HB-100 motion detector operating at 10.5 GHz, and the IPM-165 detector operating at 24 GHz. The Doppler frequency of the bees 28 flying in and out of the bee hive range from about 10 Hz to 400 Hz, the upper limit determined by the operating frequency of some detectors.

Based, in some embodiments, on either a 10.5 GHz motion detector or a 24 GHz motion detector, the bee hive activity monitor 10 can measure the total energy in the return signal due to Doppler signals from flying bees 28 and record it. The activity indices derived from these measurements can be compared with past activity levels of all hives 36 in the apiary, as well as weather conditions, to infer bee colony health. (An apiary is a group of colonies, hives, and other equipment assembled in one location for beekeeping operations, and is also known as a bee yard.)

The audio frequency amplifier 16 may be used to filter and amplifly the received signal 26 to a level detectable by the data acquisition unit 18. The data acquisition unit 18 can measure the instantaneous signal, computes the rms value over a time period (10 s to 1 min), and can store the information in the memory 24.

The data collected due to bee activity can be processed via suitable software such as MATLAB, and the results can be compared with visual observations of bee keepers.

The bee hive activity monitor 10 may provide useful information about honeybee activities within a bee hive, and may use such information to make determinations about colony health. The bee hive activity monitor 10 is inexpensive and may use a low-power Doppler radar. The bee hive activity monitor 10 may be small, portable, and low cost. Conventional manual hive inspection is time consuming and costly, and disturbing the bee colony results in a loss of productivity for several hours. Advantageously, the bee hive activity monitor 10 does not disturb the bee hive, does not require inserting a microphone into a bee hive, and does not require daily maintenance or recurring costs as some conventional monitors do. Other bee hive monitors are either expensive, need to be built into the hive, or both. Examples of conventional bee hive monitors include Solutionbee's B-ware beehive monitoring systems, Hivemind, and Arnia. The first two have a scale built under a hive to weigh it periodically, while Arnia's system measures audio levels, temperature, and humidity in a hive. Each of these systems is mounted on a single hive. None of these systems gives information on bee activity going in and out of the hives. Another commercially available system, Keltronix's Eyesonhives, does determine honeybee flying activity from video monitor recordings, but requires a connection to the internet, and bee activity is extracted from the images. These conventional systems can be expensive. Advantageously, the bee hive monitor 10 described herein can be significantly less expensive than known systems.

Furthermore, the use of a 5.8 GHz Doppler radar as a tool for assessing the foraging activities of honeybees is known. However, the presently disclosed bee hive activity monitor 10 solves problems that render a 5.8 GHz Doppler radar system not commercially viable. For example, a 5.8 GHz radar system transmits 1000 milliwatts. By comparison, a 24 Hz system transmits only 4 milliwatts. In a commercial application, a 1000 milliwatt transmitter may pose a radiation safety hazard at short range for humans and bees. Furthermore, the radar return from honeybees is 2,500 times greater at 24 GHz than the radar return at 5.8 GHz. This increased sensitivity at 24 GHz allows the use of a much lower powered, and therefore more energy efficient, transmitter. Additionally, the maximum bee Doppler frequency is 640 Hz at 24 GHz, instead of 156 Hz at 5.8 GHz. The implementation of signal amplification and filtering is significantly simplified by the wider, 0 Hz to 640 Hz, Doppler frequency spread at 24 GHz. Similar effects are achieved with a 10.5 GHz radar compared to the 5.8 GHz radar. Thus, for all of these reasons, the bee hive activity monitor 10 provided herein is a considerable improvement, and not merely an alternative, to a 5.8 GHz Doppler radar-based system for monitoring the activity of flying insects such as honey bees.

The bee hive activity monitor 10 may be mounted on a bee hive, or may otherwise be disposed in proximity to a bee hive. However, though the bee hive activity monitor 10 is described with reference to bees for exemplary purposes, the bee hive activity monitor is not confined to use with bees. Rather, the bee hive activity monitor 10 can be used to monitor activity of any flying insect.

Figure 2:
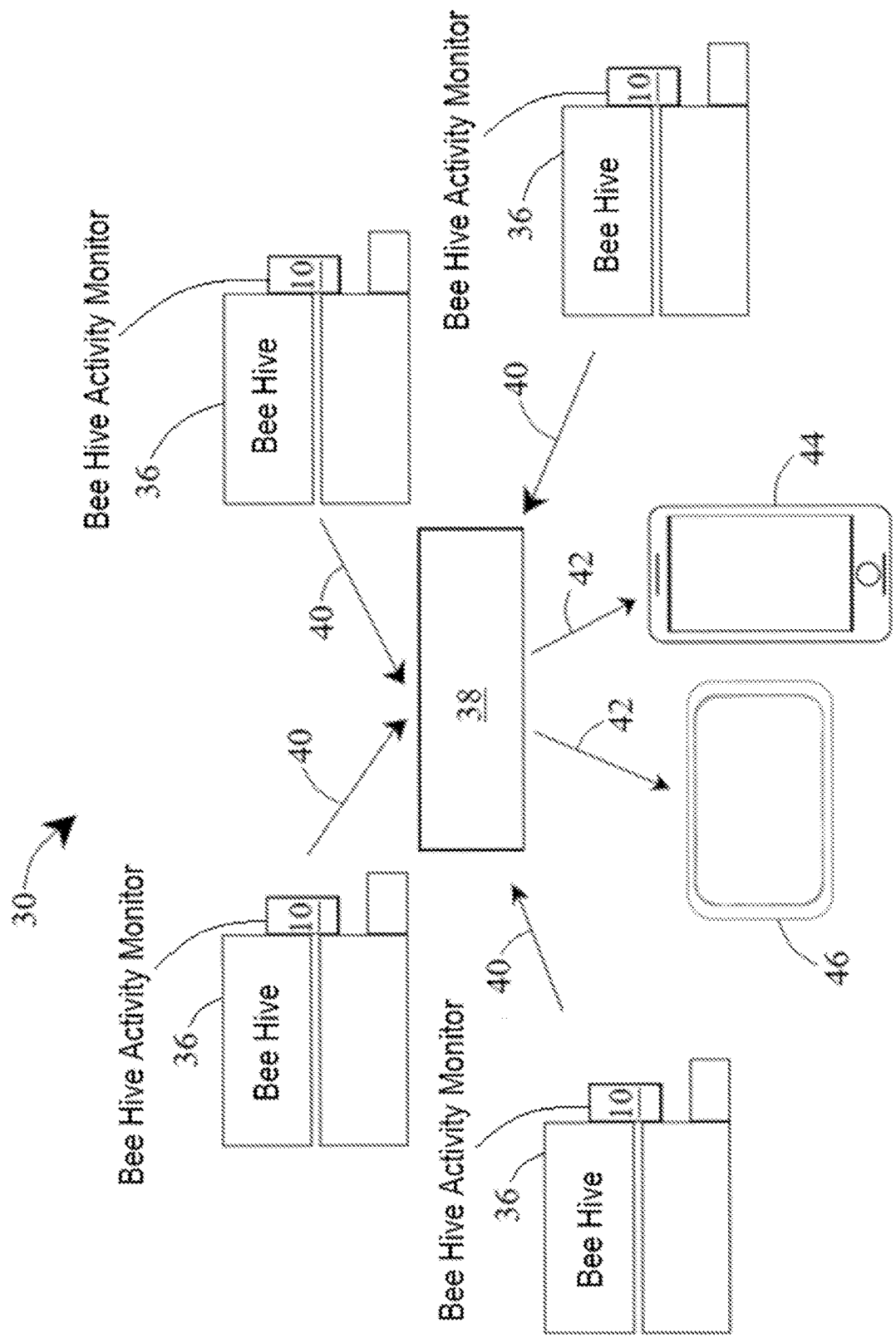
FIG. 2: Schematic illustration of a non-limiting example of a system for monitoring bee hive activity in accordance with the present disclosure.

Referring now to FIG. 2, a plurality of bee hive activity monitors 10 can be utilized in a system 30 for monitoring bee hive activity. There is no limit to the number of bee hive activity monitors 10 that can be included in the system 30. The system 30 for monitoring bee hive activity may include a central base station 38 in wireless communication with one or more smart devices 44, 46, and in wireless communication with a plurality of bee hive activity monitors 10 disposed adjacent, or otherwise in proximity, to hives 36. FIG. 2 depicts a bee hive monitoring system through a system-level representation showing the individual bee hive activity monitors 10 that are attached to, or located near, bee hives 36, the central base station 38 which collects and processes data from the bee hive activity monitors 10, and different ways to access the information on the central base station's server software.

The system 30 may utilize an algorithm, implemented in firmware in the central base station 38, that records or calculates an activity index as a single time-stamped number, based on the measurement in each bee hive activity monitor 10 from the Doppler radar return signal that is due to incoming and outgoing bees 28. The central base station 38 may optionally include a memory, such as an SD card, for storing data. The bee hive activity monitors 10 in the system 30 can transmit the activity index to the central base station 38 through a radio communication link 40. In other embodiments, the central base station 38 may calculate the activity index from raw data transmitted to the central base station 38 from the bee hive activity monitors 10.

The central base station 38 may provide communication between the system 10 and the outside world through a communication link 42. For example, the central base station 38 may communicate wirelessly, such as through a Wi-Fi network, to one or more smart devices 44, 46. However, other communication links 42 are possible. For example, the central base station 38 may be physically wired to one or more of the bee hive activity monitors 10. As another example, the central base station 38 may communicate to the smart devices 44, 46 through a Bluetooth connection.

The central base station 38 may act as a processing unit that implements one or more algorithms. An algorithm implemented in the central base station 38 may compare the activity indices reported by the bee hive activity monitors 10 with previously recorded activity indices to determine hive activity levels as a function of time. The algorithm may also compare the activity indices from the bee hive activity monitors 10 with other bee hive activity monitors 10 on other bee hives 36 in the same apiary, to make a judgment on the relative health of the hives 36. The algorithm may also compare the activity indices with measured weather conditions, including temperatfure and solar flux, to detect anomalous behavior. The algorithm may use anomalously increased activity behavior to predict and determine the timing of a bee colony swarm event. The algorithm may use anomalously increased activity behavior to determine the onset of an attack on the colony by robber bees. The algorithm may use anomalously decreased activity behavior to determine a sickly bee colony. Appropriate remedial actions may then be taken based on a prediction by the algorithm using the anomalous change in activity behavior.

Figure 3:
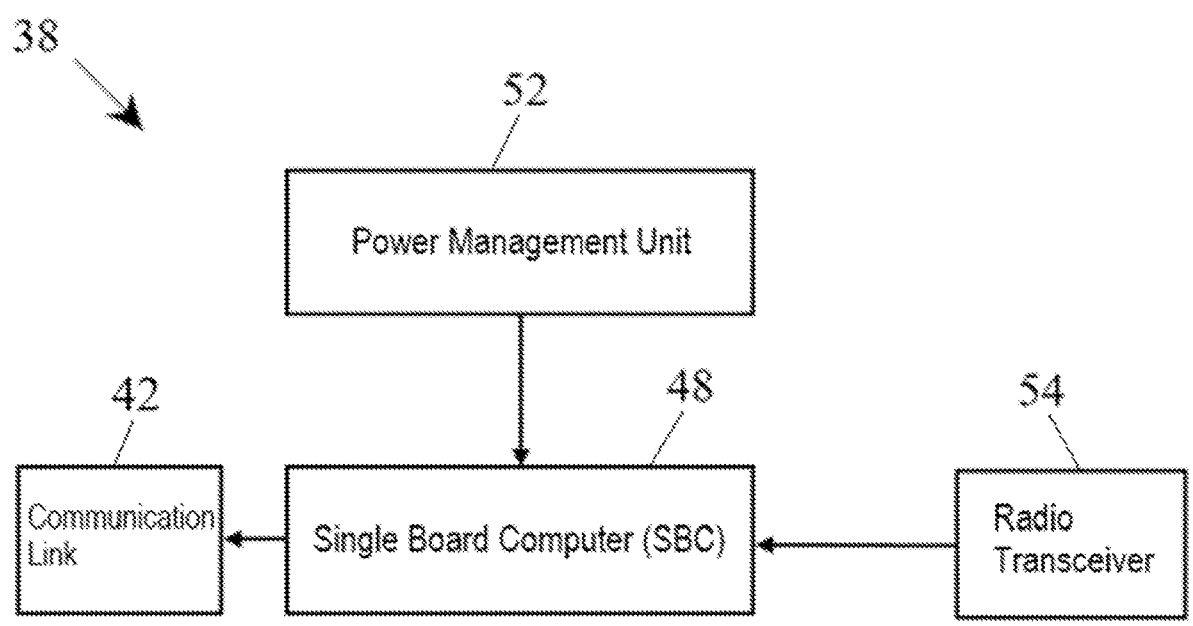
FIG. 3: Schematic illustration of a non-limiting example of a central base station in accordance with the present disclosure.

Referring now to FIG. 3, a functional block diagram of a non-limiting example of a central base station 38 is shown. The data from bee hive activity monitors 10 may be received by a radio transceiver 54 within the central base station 38. In one non-limiting example, the radio communications are through a RFM69W transceiver. However, other radio transceivers are possible and encompassed within the scope of the present disclosure. The radio transceiver 54 can transmit the data to a single board computer (SBC) 48. The data can be stored and processed on the SBC 48 within the central base station 38. In one non-limiting example, the SBC 48 is a Raspberry Pi Zero. However, other SBCs are possible and encompassed within the scope of the present disclosure. The data may be made available to the end user via the communication link 42, which may be, for example, a WiFi network. However, other communication links 42 are possible and encompassed within the scope of the present disclosure. The central base station 38 may further include a power management unit 52 that may contain one or more of a battery, a solar panel, a battery charger, and a voltage converter. The power management unit 52 may provide a source of power for the central base station 38, permitting the central base station 38 to operate in the field without access to electricity from the power grid.

The bee hive monitor 10, and the system 30, may be particularly useful in connection with agriculture, such as, for example, in connection with blueberry agriculture. A typical commercial blueberry grower may hire up to 1,000 bee hives during the pollination period. Because it is impractical to manually check on the productivity of all of these hives, an inexpensive, easily installed, and automatic bee hive activity monitor is needed. The bee hive activity monitor 10, and the system 30, can be used to study bee colony health, and make predictions about imminent events occurring in a bee colony, while being monitored from a remote location. The bee hive activity monitor 10, and the system 30, allow a user to listen to a bee hive and measure bee activity remotely based on the Doppler signals generated from flying bees.

Certain embodiments of the systems, apparatuses, and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the compositions and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. An apparatus for monitoring bee hive activity comprising:
    a Doppler radar front end comprising a microwave detector configured to generate a Doppler signal when a flying insect flies in proximity to the apparatus, wherein the microwave detector operates at a frequency in a range of from about 10.5 GHz to about 24 GHz;
    an audio frequency amplifier in communication with the Doppler radar front end; and
    a data acquisition unit configured to measure the root-mean-square (rms) value of the Doppler signals over a period of time;
    wherein the audio frequency amplifier is configured to amplify the Doppler signal to a level detectable by the data acquisition unit.

2. The apparatus of claim 1, wherein the microwave detector operates at a frequency of about 24 GHz.

3. The apparatus of claim 1, wherein the microwave detector operates at a frequency of about 10.5 GHz.

4. The apparatus of claim 1, further comprising a memory configured to store the rms value.

5. The apparatus of claim 1, further comprising a processor configured to compare the rms value to one or more previously generated values.

6. The apparatus of claim 1, wherein the apparatus is configured to communicate wirelessly to a central base station through a radio communication link.

7. The apparatus of claim 1, wherein the apparatus is mounted on a beehive.

8. A system for monitoring bee hive activity, the system comprising:
    a plurality of apparatuses for monitoring bee hive activity of claim 1, wherein each of the plurality of apparatuses for monitoring bee hive activity is disposed in an area proximate to a bee hive; and
    a central base station in wireless communication with the plurality of apparatuses for monitoring bee hive activity;
    wherein the central base station is configured to record or calculate an activity index from data received from the apparatuses for monitoring bee hive activity.

9. The system of claim 8, wherein the plurality of apparatuses for monitoring bee hive activity communicate with the central base station via radio.

10. The system of claim 8, wherein the central base station is in wireless communication with a smart device.

11. The system of claim 8, further comprising one or more smart devices in wireless communication with the central base station.

12. The system of claim 8, wherein the central base station comprises a radio communicatively coupled to a single board computer.

13. The system of claim 8, wherein the central base station comprises a power management unit configured to supply power to the central base station.

14. The system of claim 13, wherein the power management unit comprises one or more of a solar panel, a battery, a battery charger, and a voltage converter.

15. The system of claim 8, wherein the central base station communicates data over a WiFi network.

16. A method for monitoring bee hive activity, the method comprising:
    measuring total energy in a return signal due to Doppler signals from flying bees; and
    comparing the total energy to one or more past activity levels to monitor bee hive activity;
    wherein the measuring is conducted with a microwave detector operating at a frequency in a range of from about 10.5 GHz to about 24 GHz.

17. The method of claim 16, wherein the microwave detector operates at a frequency of about 10.5 GHz.

18. The method of claim 16, wherein the microwave detector operates at a frequency of about 24 GHz.

19. The method of claim 16, wherein the one or more past activity levels are compared taking into account weather conditions.

20. The method of claim 16, wherein an activity index based on the measurement is calculated.

21. The method of claim 16, comprising comparing the total energy to measured weather conditions to detect anomalous behavior.

22. The method of claim 16, wherein anomalously increased activity behavior compared to the past activity levels predicts the timing of a bee colony swarm event.

23. The method of claim 16, wherein anomalously decreased activity behavior compared to the past activity levels predicts a sickly bee colony.

24. The method of claim 16, wherein an algorithm converts analog radar signals into digital signals, and compresses the digital signals into activity indices.

25. The method of claim 24, wherein the activity indices are corrected for environmental conditions.

26. The method of claim 25, wherein the environmental conditions comprise temperature or solar radiation.

\* \* \* \* \*